United States Patent [19]

Moore

[11] Patent Number: 4,957,679
[45] Date of Patent: Sep. 18, 1990

[54] METHOD OF MAKING INTERFOLDED SHEETS OF PLASTIC FILM
[75] Inventor: Neal E. Moore, Dublin, Calif.
[73] Assignee: James River II, Inc., Oakland, Calif.
[21] Appl. No.: 384,202
[22] Filed: Jul. 24, 1989
[51] Int. Cl.$^5$ ........................ B29C 53/04; B29C 69/00
[52] U.S. Cl. ................................... 264/152; 264/145; 264/285; 525/86; 525/240
[58] Field of Search ............... 264/138, 145, 146, 147, 264/152, 285, 300; 525/86, 240

[56] References Cited
U.S. PATENT DOCUMENTS

| | | | |
|---|---|---|---|
| 4,580,012 | 4/1986 | Canterino et al. | 525/240 |
| 4,716,201 | 12/1987 | Canterino et al. | 525/240 |
| 4,743,649 | 5/1988 | Dobreski | 525/86 |
| 4,786,678 | 11/1988 | Dobreski et al. | 525/240 X |
| 4,826,920 | 5/1989 | Dobreski | 525/86 |

Primary Examiner—Jeffery Thurlow
Assistant Examiner—Leo B. Tentoni
Attorney, Agent, or Firm—Stanley M. Teigland

[57] ABSTRACT

When a film consisting of high density polyethylene and about three percent polystyrene is run on an interfolding machine to produce interfolded sheets of the film for use as deli wrap, the film is completely and consistently cut in the machine into sheets that are entirely separated from adjacent sheets. In comparison, sheets made from film consisting of 100 percent high density polyethylene are not consistently completely separated from adjacent sheets.

8 Claims, No Drawings

METHOD OF MAKING INTERFOLDED SHEETS OF PLASTIC FILM

BACKGROUND OF THE INVENTION

Interfolded sheets of plastic film are typically used to wrap articles of food, such as bakery and delicatessen items, at their retail point of purchase. The sheets are boxed in paperboard cartons. Because the sheets are interfolded, they pop up, like facial tissue, when they are dispensed. However, a common problem with the sheets is that they are not completely separated from adjacent sheets, with the result that when a sheet is pulled from the carton, successive sheets follow because they are not completely separated from adjacent sheets.

SUMMARY OF THE INVENTION

This is a method of making the sheets so that they are consistently completely separated from adjacent sheets. The method consists of employing, as the plastic film from which the sheets are made, a film comprising a blend of from 80 to 99 percent high density polyethlene and from 1 to 20 percent of a styrene polymer.

The term high density polyethylene refers to an ethylene polymer having a density of more than 0.94 g/cc. The polymer is preferably ethylene homopolymer. The proportion of high density polyethylene in the blend is preferably between about 90 and 99 percent, more preferably between about 95 and 98 percent.

The term styrene polymer refers to polystyrene, poly(p-methylstyrene), rubber-modified polystyrene, and rubber-modified poly(p-methylstyrene). These polymers are described in 21 CFR 177.1635 and 177.1640, which are incorporated herein by reference. Rubber-modified styrene polymers are prepared by polymerizing styrene or p-methylstyrene in the presence of a rubber such as polybutadiene with a free radical catalyst such as benzoylperoxide under conditions that promote grafting of polystyrene or poly(p-methylstyrene) onto the rubber backbone. The rubber generally comprises 1 to 20 weight percent, preferably 4 to 10 weight percent, of the polymer. The styrene polymer is preferably polystyrene or poly(p-methylstyrene), more preferably polystyrene. The object of this invention is achieved by adding three percent polystyrene to the blend. There is no advantage in adding more polystyrene, but more may be added if desired. The proportion of polystyrene in the blend is preferably between about 1 and 10 percent, more preferably between about 2 and 5 percent.

The blend may contain other polymer components or additives if desired. However, the blend preferably consists only of the high density polyethylene and the styrene polymer.

Numerous patents disclose films made from blends comprising a styrene polymer and linear low density polyethylene. The patents teach that the blends result in improved process conditions, such as reduced extruder torque, or improved film properties, such as reduced blocking. The patents broadly suggest blending a styrene polymer with other linear ethylene polymers, but the patents contain no examples of a blend of a styrene polymer with high density polyethylene. The reason for this is believed to be that the properties of linear low density polyethylene that are improved by the addition of a styrene polymer are not properties that need to be improved, for practical purposes, for high density polyethylene. Hence, these patents do not provide motivation to one skilled in the art to add a styrene polymer to high density polyethylene to make a film for use as interfolded sheets. The patents include U.S. Pat. Nos. 4,579,912; 4,716,201; 4,743,649; 4,786,678 and 4,826,920.

Prior to this invention, interfolded sheets of plastic film were typically made from 100 percent high density polyethylene, which was blown in order to provide a thin film. The film typically has a thickness between about 0.5 and 0.7 mil.

The sheets of this invention are made on the same interfolding machines and under the same conditions as the sheets of the prior art. The machines cut a continuous length of the film into separate sheets by shearing the film with a knife blade. The sheets are then interfolded by the machine. Compared to interfolded sheets of the prior art made by the same method but containing 100 percent high density polyethylene, the sheets of this invention are more completely and consistently cut by the blade and therefore are more completely separated from adjacent sheets.

DESCRIPTION OF THE PREFERRED EMBODIMENT

The following example represents the best mode contemplated for practicing the invention.

EXAMPLE

A blown film having a thickness of 0.6 mil was made from a blend of 97 percent high density polyethylene and 3 percent polystyrene by weight. The polyethylene, sold under the designation Chevron LX-1159, had a density of 0.96 and a melt index of 1.0. The polystyrene was sold under the designation Dow LR-175. The film was run on a Paper Converting Machine Company interfolding machine that had been used commercially for years to make boxed, interfolded sheets of film consisting of high density polyethylene. The film made from the blend ran well on the machine and the resulting interfolded sheets were consistently completely separated from adjacent sheets. In comparison, interfolded sheets made entirely of the high density polyethylene were not completely or consistently separated from adjacent sheets.

I claim:

1. A method of producing interfolded sheets of plastic film containing at least eighty percent high density polyethylene comprising cutting a continuous length of the film with a knife blade into separate sheets and interfolding the sheets, the improvement wherein the film contains from about one to about twenty percent of a styrene polymer selected from the group consisting of polystyrene, poly(p-methylstyrene), rubber-modified polystyrene, and rubber-modified poly(p-methylstyrene), whereby the sheets are more completely cut by the blade and thereby more completely and consistently separated from adjacent sheets.

2. The method of claim 1 wherein the styrene polymer is polystyrene or poly(p-methylstyrene).

3. The method of claim 1 wherein the styrene polymer is polystyrene.

4. The method of claim 2 wherein the film contains from about one to ten percent of the styrene polymer.

5. The method of claim 4 wherein the styrene polymer is polystyrene.

6. The method of claim 2 wherein the film contains from about two to five percent of the styrene polymer.

7. The method of claim 6 wherein the styrene polymer is polystyrene.

8. The method of claim 1 wherein the film consists essentially of from about 2 to 5 percent polystyrene and correspondingly from about 95 to 98 percent high density polyethylene.

* * * * *